(12) United States Patent
Camis, Jr.

(10) Patent No.: US 7,331,360 B2
(45) Date of Patent: Feb. 19, 2008

(54) CHECK VALVE WITH LOW SHUT OFF SOUND

(76) Inventor: Theodore Gerald Camis, Jr., 34 Witt Rd., S. Barrington, IL (US) 60010

( * ) Notice: Subject to any disclaimer, the term of this patent is extended or adjusted under 35 U.S.C. 154(b) by 367 days.

(21) Appl. No.: 11/046,494

(22) Filed: Jan. 28, 2005

(65) Prior Publication Data

US 2006/0169329 A1 Aug. 3, 2006

(51) Int. Cl.
*F16K 15/16* (2006.01)
(52) U.S. Cl. .................... 137/512.3; 137/855
(58) Field of Classification Search .......... 137/512, 137/512.3, 844, 845, 846, 855, 856, 857, 137/858; 138/45, 46
See application file for complete search history.

(56) References Cited

U.S. PATENT DOCUMENTS

| | | | | | |
|---|---|---|---|---|---|
| 431,592 | A | * | 7/1890 | Kinn | 137/512.3 |
| 700,403 | A | * | 5/1902 | Block | 137/512 |
| 2,322,631 | A | * | 6/1943 | Groeniger | 137/218 |
| 2,335,832 | A | * | 11/1943 | Williams | 137/512 |
| 2,896,661 | A | * | 7/1959 | Becker et al. | 137/512.3 |
| 3,007,527 | A | * | 11/1961 | Nelson | 137/845 |
| 3,072,145 | A | * | 1/1963 | Nelson | 137/846 |
| 3,115,155 | A | * | 12/1963 | Clark | 137/512.3 |
| 4,003,398 | A | * | 1/1977 | Duveau | 137/512 |
| 6,089,260 | A | * | 7/2000 | Jaworski et al. | 137/512 |

* cited by examiner

*Primary Examiner*—John Rivell
(74) *Attorney, Agent, or Firm*—Michael Ries (57) ABSTRACT

The present invention relates to the field of check valves and more specifically to check valves with substantially low operational noise or low shut off noise. Provided is changing a direction of a fluid that closes a first and second flap to produce a slit, gap or orifice. Also provided is passing the fluid through the slit that reduces the speed of the fluid. The reduced speed fluid slowly closes a third flap and reduces shut off noise. The closed third flap creates a tight seal to stop any further fluid flow.

8 Claims, 8 Drawing Sheets

CHECK VALVE WITH LOW SHUT OFF SOUND

TECHNICAL FIELD & BACKGROUND

The present invention generally relates to the field of check valves. More specifically, the present invention relates to check valves with substantially low sound when shutting off.

There is a constant search in the check valve industry to find new ways to help decrease the overall sound produced when a check valve operates and particularly when a check valve shuts off flow. Similar products on the market today create operational sound or noise during over all operation and when shutting off. The present invention delivers a substantially low sound or reduced sound check valve by providing a plurality of stages with a plurality of flaps. The plurality of stages may be a first stage and a second stage. The plurality of flaps may include a first and second flap that may be half circles with a space or slit between them and a third flap upstream or downstream when a fluid is in a forward flow, from the first and second flaps. The fluid includes fluids with solid particles and slurries.

The first and second flaps are arranged in a manner that prevents the third flap from closing quickly, thus substantially eliminating operational noise and shut off noise. And the third flap is not dependent on the arrangement of its location from the first flap and second flap, in other words the first and: second flaps can come first then the third flap or vise versa, when the fluid is in forward or reverse flow. A common application is a check valve used in conjunction with sump pumps removing ground water from foundation footings. In the past, when a check valve is used in a dwelling or any other application the overall operational noise would be elevated and may disturb occupants.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
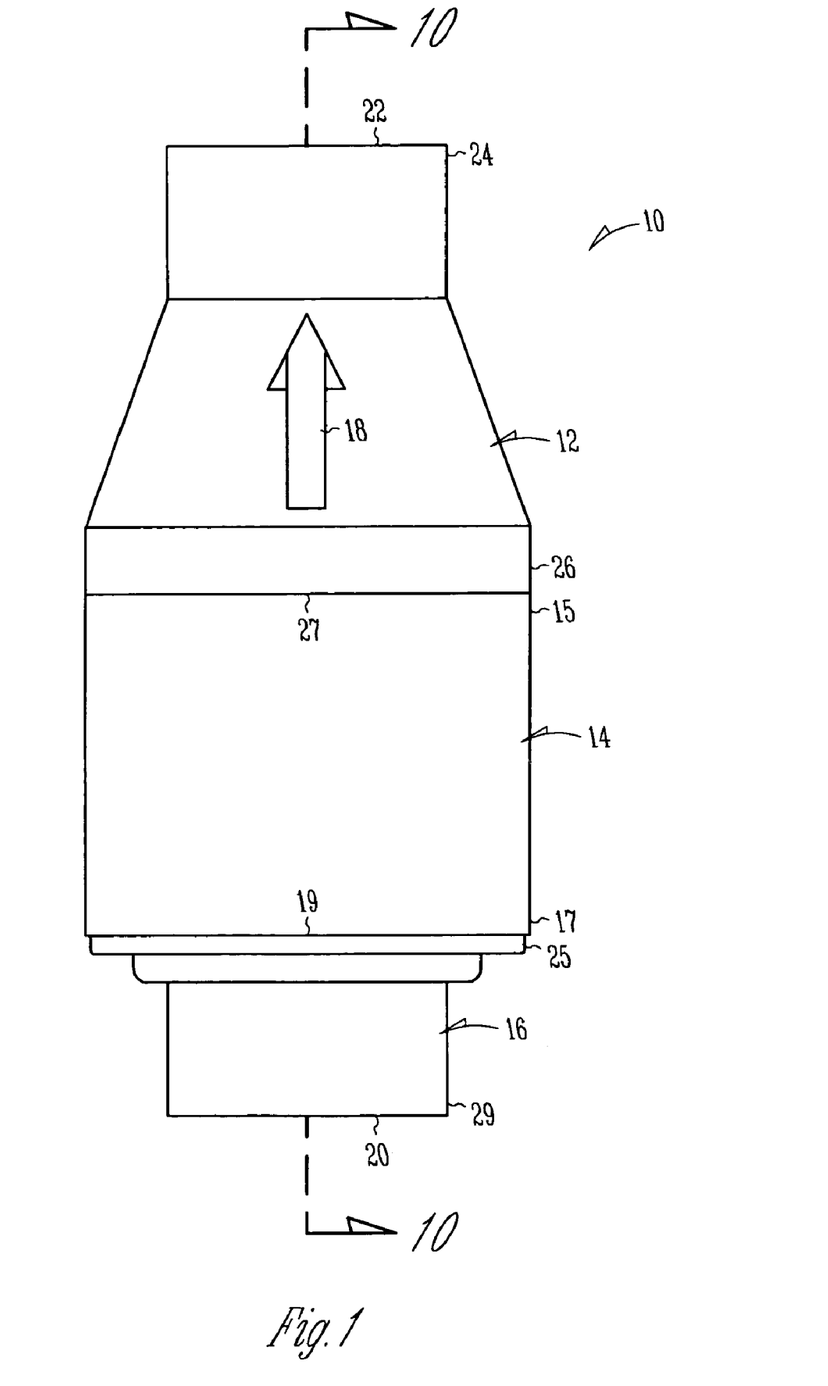
FIG. 1 illustrates a drawing of a reduced sound check valve, in accordance with one embodiment of the present invention.

Referring now to FIG. 1, shown is a check valve 10 having substantially low sound or noise. Illustrated are an outlet 12, body 14 and inlet 16. Flow direction is shown by forward fluid flow or pump on indicator 18 with the check valve 10 having an entrance 20 and exit 22. Outlet 12 has an outlet exit end 24 and an outlet entrance end 26, where outlet entrance end 26 is at a first seam 27. Body 14 has a body exit end 15 and a body entrance end 17, where body exit end 15 is at the first seam 27 and body entrance end 17 is at a second seam 19. Inlet 16 has an inlet exit end 25 and an inlet entrance end 29, where inlet exit end 25 is at the second seam 19.

Figure 2:
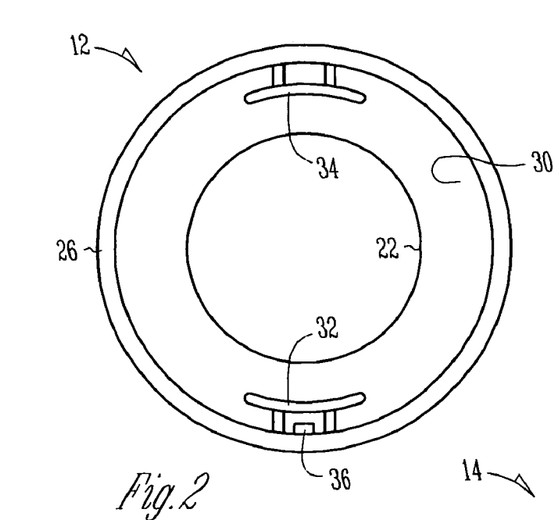
FIG. 2 illustrates a drawing of an end view of an outlet, in accordance with one embodiment of the present invention.

Referring to FIG. 2, shown is one embodiment of the outlet 12 disassembled from body 14 at the first seam 27. Illustrated is an end view at the outlet entrance end 26. Outlet 12 extends between outlet exit end 24 and outlet entrance end 26 and produces a gradual narrowing of an inside surface 30 of outlet 12. This gradual narrowing substantially reduces the sound made by a flow of fluid inside outlet 12. Outlet 12 has at least one holder, shown is a first holder 32 and a second holder 34. First holder 32 and second holder 34 may be a molded part of the outlet 12. A first alignment tab 36 is disposed about the outlet entrance end 26.

Figure 3:
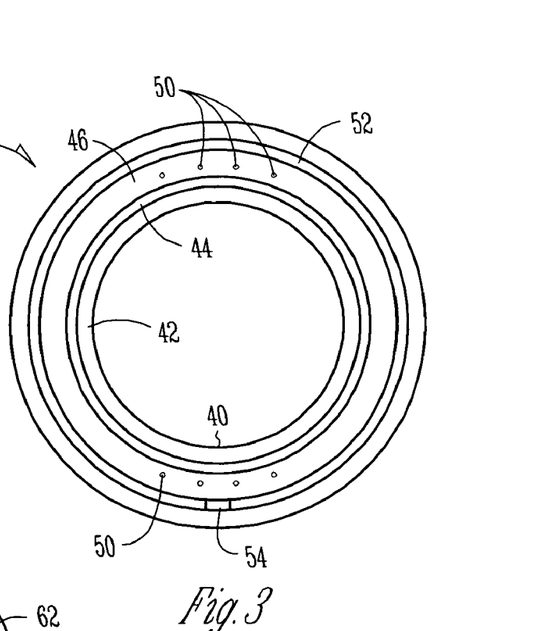
FIG. 3 illustrates a drawing of an end view of a first stage, without a first and second flap in accordance with one embodiment of the present invention.

Referring to FIG. 3, in one embodiment of the body 14 disassembled from outlet 12 at the first seam 27. Illustrated is an end view of the body 14 at the body exit end 15. Shown is a step inside diameter 40, first flapper seat 42, first seat groove 44 and first flapper mount shelf 46. First flapper seat 42 may be a substantially flat surface. First seat groove 44 surrounds the first flapper seat 42 and may be a depression in the material used to construct the check valve 10. Check valve 10 maybe made by injection molding the various parts using appropriate material. The material may be a plastic compound or any other appropriate material. A first flapper mount shelf 46 surrounds the first seat groove 44 and has a plurality of first flapper attachments 50, first flapper attachments 50 may be in the shape of pins or any other appropriate shape. The first flapper mount shelf 46 may be generally flat. The plurality of first flapper attachments 50 may be in two separate opposing groups. A first ridge 52 surrounds the first flapper mount shelf 46 and provides for the seal between body 14 and outlet 12. A first alignment notch 54 is disposed about first ridge 52 and formed into first ridge 52. The first alignment tab 36, from FIG. 2, fits into the first alignment notch 54 to properly align outlet 12 and body 14 during assembly. The first ridge 52 seats into outlet 12 and glue is applied to form a permanent connection between outlet 12 and body 14.

Figure 4:
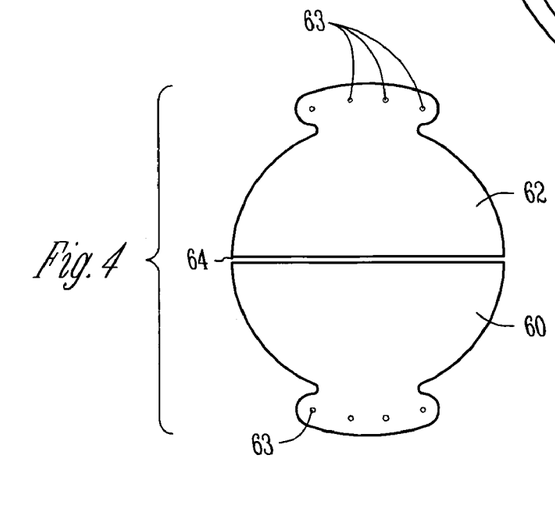
FIG. 4 illustrates a drawing of the first and second flap independent of the reduced sound check valve, in accordance with one embodiment of the present invention.
Figures 5, 6, 7:
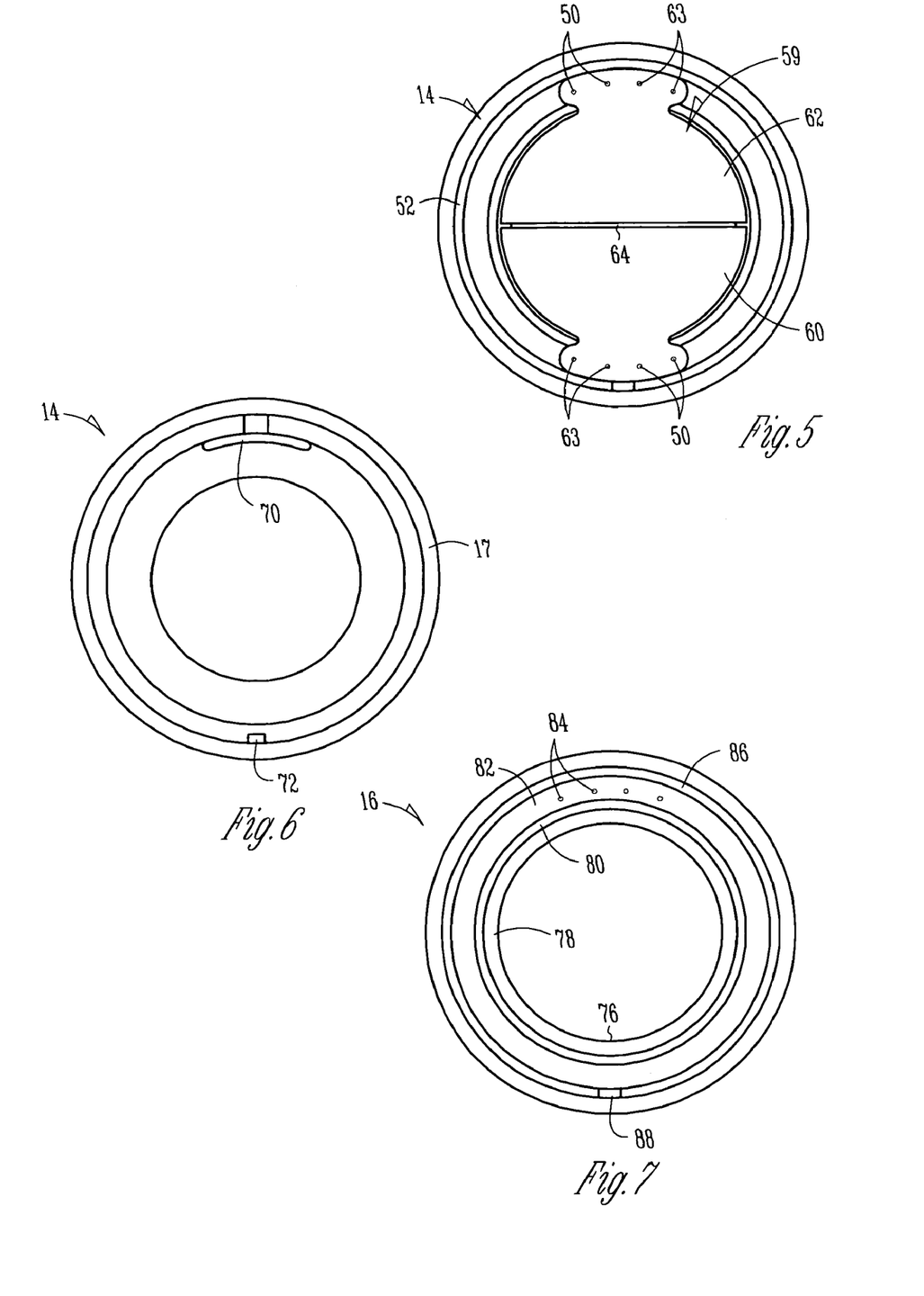
FIG. 5 illustrates an end view where the first flap and second flap are placed on the body, in accordance with one embodiment of the present invention.
FIG. 6 illustrates a drawing of another end the body, in accordance with one embodiment of the present invention.
FIG. 7 illustrates a drawing of an end of an inlet, in accordance with one embodiment of the present invention.

Referring to FIG. 4, as in one embodiment, shown is a top view of a first flap 60 and a second flap 62. First flap 60 and second flap 62 have a plurality of holes 63. First flap 60 may have a first plurality of holes and second flap 62 may have a second plurality of holes. Referring to FIG. 5, as in one embodiment, shown is a first stage 59 where the body 14 is disassembled from outlet 12 at the first seam 27. Illustrated is an end view at the body exit end 15. The first flap 60 and second flap 62 are placed on the plurality of first flapper attachments 50 at the plurality of holes 63 leaving a gap or slit 64 between the first flap 60 and second flap 62.

Referring to FIG. 6, shown, as in one embodiment of the body 14 disassembled from inlet 16 at the second seam 19. Illustrated is an end view at the body entrance end 17. Body 14 has at least one holder, shown is a third holder 70 and third holder 70 that may be a molded part of body 14. A second alignment tab 72 is disposed about a body entrance end 17. Referring to FIG. 7, shown is one embodiment of the inlet 16 disassembled from body 14 at the second seam 19. Illustrated is an end view at the inlet exit end 25. Shown is an inlet inside diameter 76, second flapper seat 78, second seat groove 80 and second flapper mount shelf 82. The second flapper seat 78 may be a substantially flat surface. Second seat groove 80 surrounds the second flapper seat 78 and may be a depression in the material used to construct the check valve 10.

In FIG. 7, the second flapper mount shelf 82 surrounds the second seat groove 80 and has a second plurality of flapper attachments 84, the second plurality of flapper attachments 84 may be in the shape of pins. The second flapper mount shelf 82 may be generally flat. The second plurality of flapper attachments 84 may be in one group. A second ridge 86 surrounds the second flapper mount shelf 82 and generally provides for the seal between the body 14 and the inlet 16. A second alignment notch 88 is disposed about the second ridge 86 and may be formed into the second ridge 86. The second alignment tab 72, from FIG. 6, fits into the second alignment notch 88 to properly align body 14 and inlet 16 during assembly. The second ridge 86 seats into body 14 and glue is applied to form a permanent connection between inlet 16 and body 14.

Figure 8:
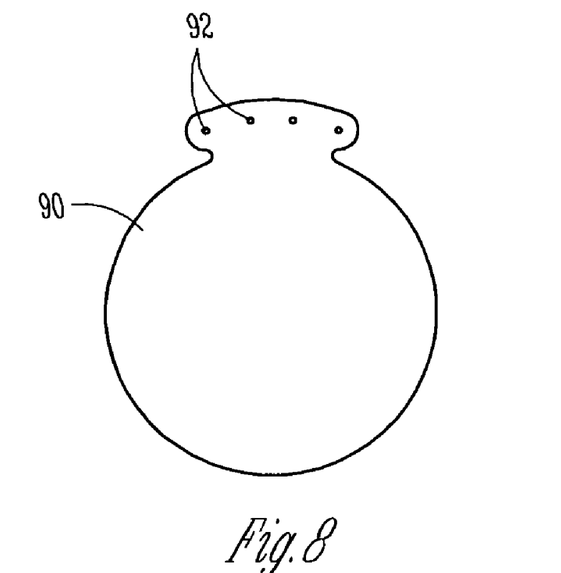
FIG. 8 illustrates a drawing of a third flap independent of the reduced sound check valve, in accordance with one embodiment of the present invention.
Figure 9:
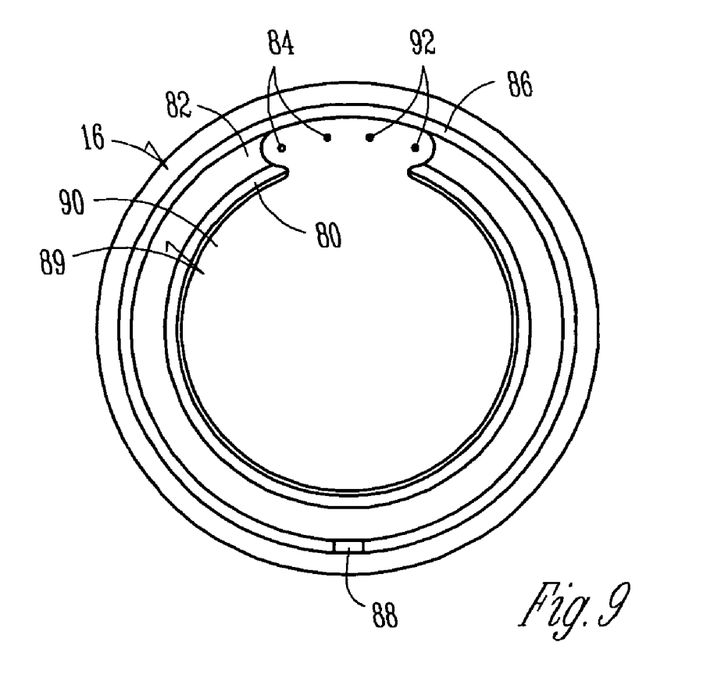
FIG. 9 illustrates a drawing of an end view of the outlet showing a second stage, in accordance with one embodiment of the present invention.
Figure 10:
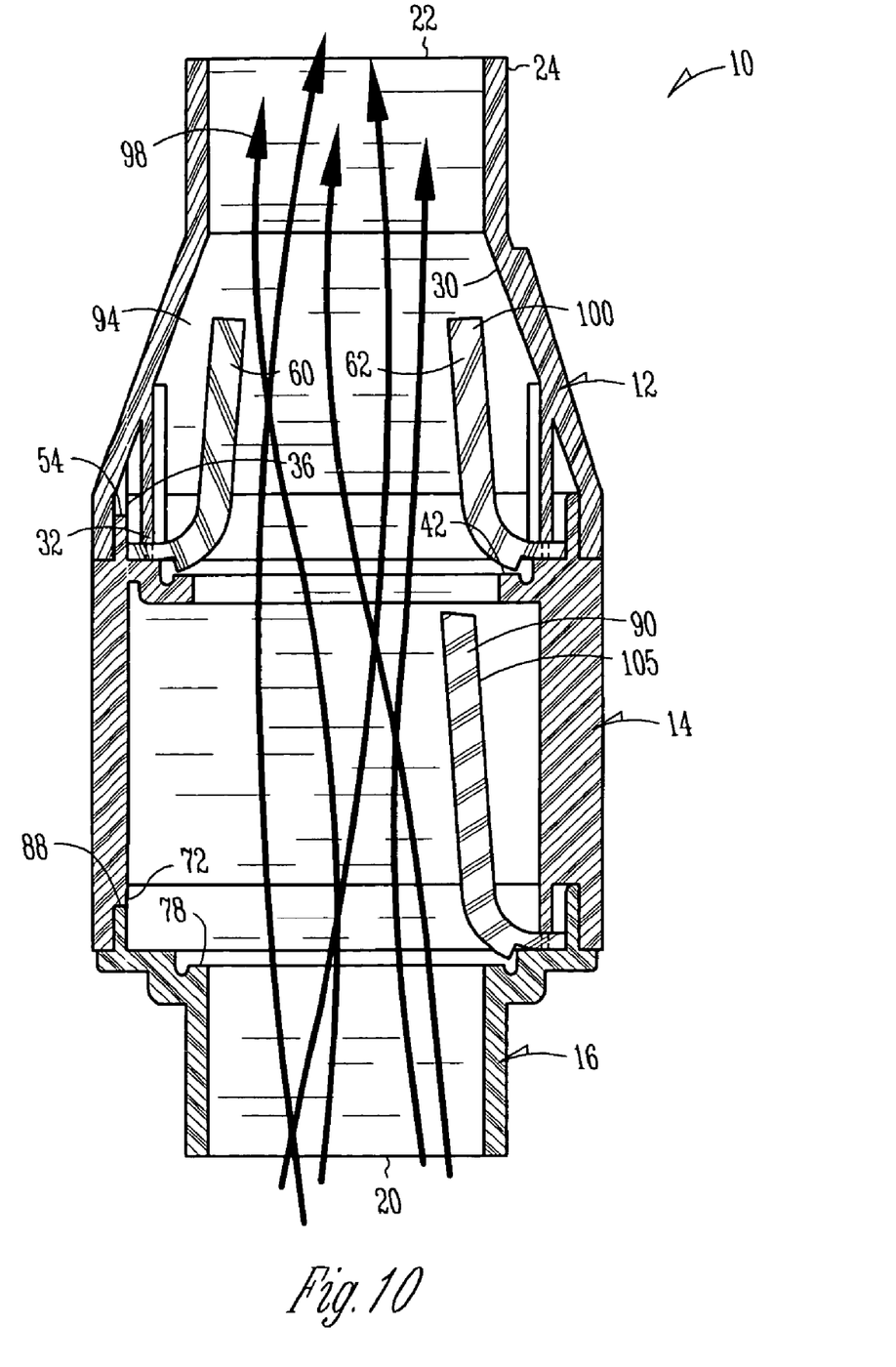
FIG. 10 illustrates a drawing of the check valve with a forward flow, in accordance with one embodiment of the present invention.

Referring to FIG. 8, as in one embodiment, shown is a top view of a third flap 90 having a third plurality of holes 92. Referring to FIG. 9, as in one embodiment, shown is the inlet 16 disassembled from body 14 at the second seam 19. Illustrated is an end view of the inlet 16 at the inlet exit end 25. The third flap 90 is placed on the second plurality of flapper attachments 84 at the third plurality of holes 92 and may completely sealing the inlet inside diameter 76. In FIG. 10, as in one embodiment, shown is the check valve 10 with the fluid in a forward flow 98. A first open position 94, a second open position 100 and a third open position 105 are illustrated.

Figure 11:
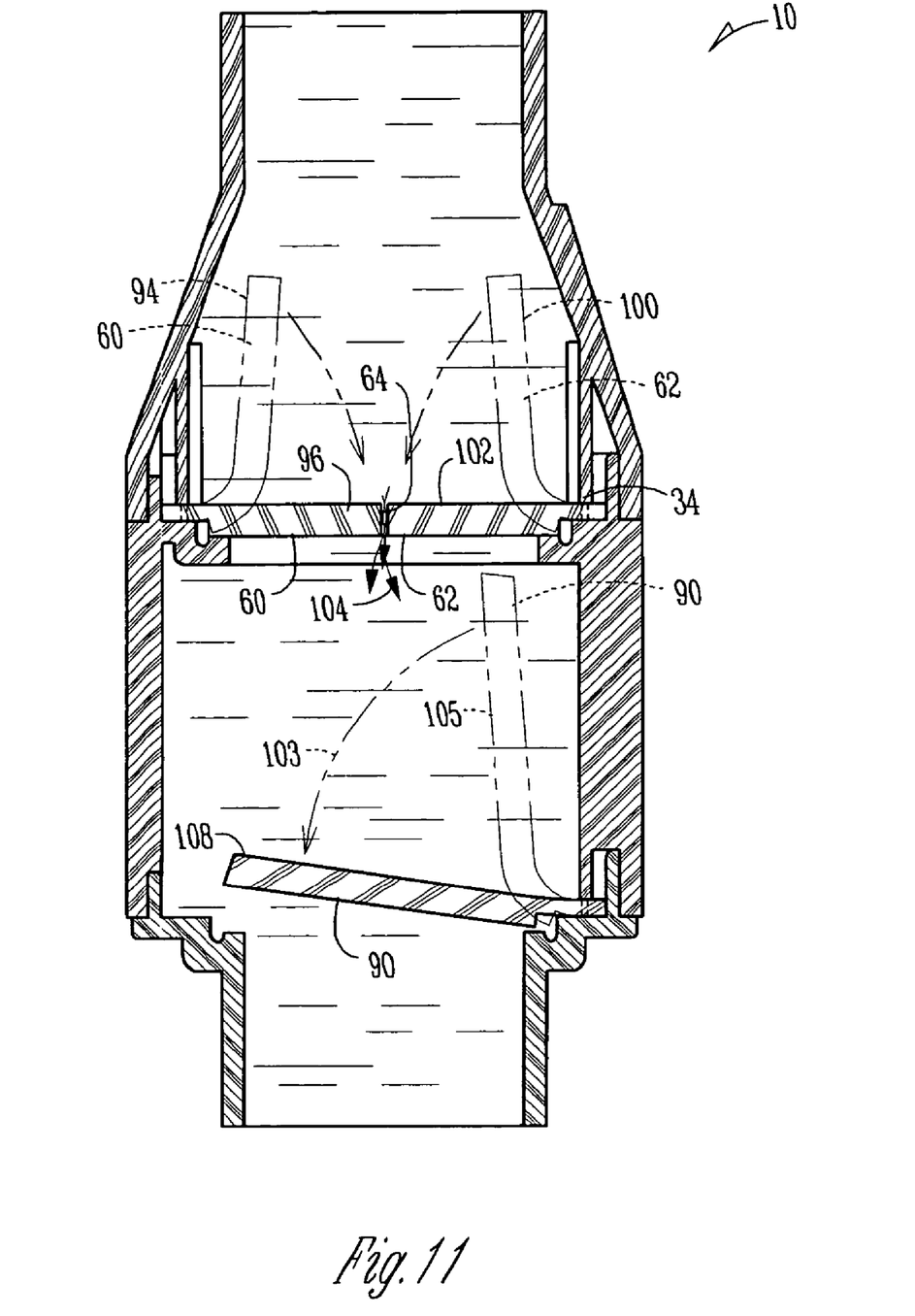
FIG. 11 illustrates a drawing of the check valve after a reverse flow and with the reverse flow reduced in speed, in accordance with one embodiment of the present invention.

In FIG. 11, as in one embodiment, shown are both a first closed position 96 and a second closed position 102 that produce the slit 64. Slit 64 allows the fluid, when in reverse flow or a pump is off, to flow at a reduced speed or to pass through 104 the first flap 60 and second flap 62. This reduced speed flow of fluid though slit 64 slowly moves 103 the third flap 90 from the third open position 105 to a third substantially closed position 108.

Figure 12:
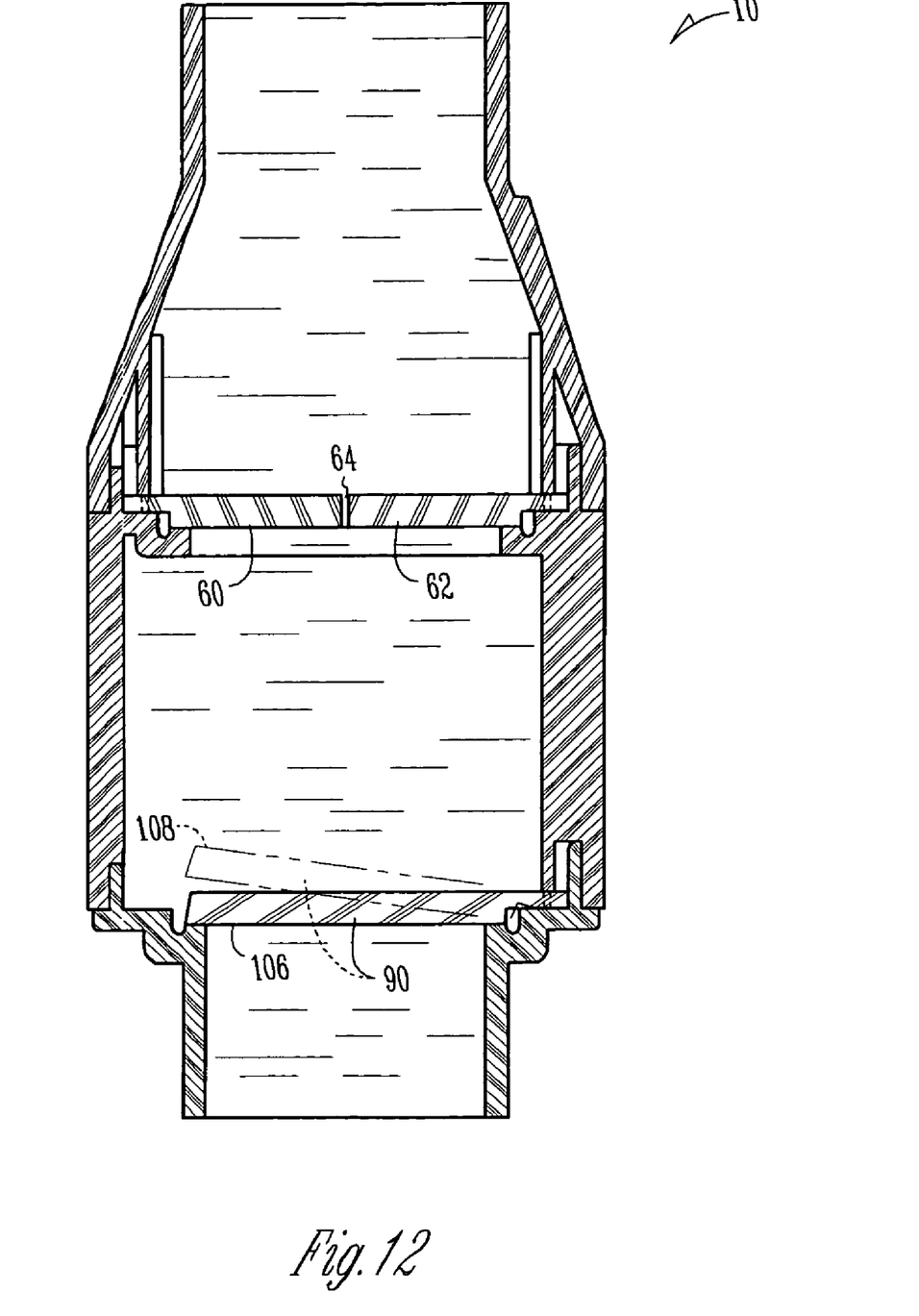
FIG. 12 illustrates a drawing of the check valve after a reverse flow and with the reverse flow reduced in speed and stopped with the third flap closed, in accordance with one embodiment of the present invention.
Figure 13:
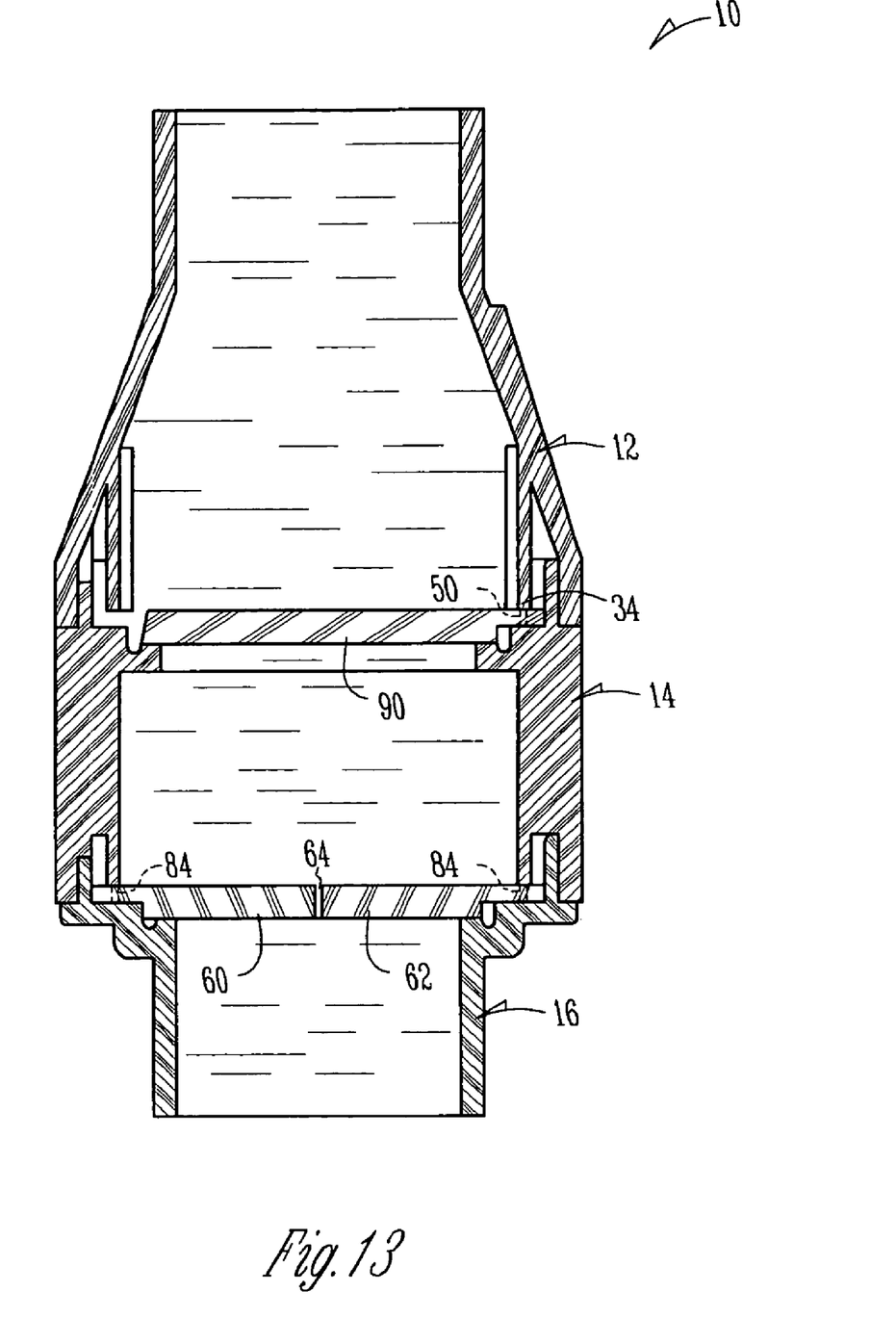
FIG. 13 illustrates a drawing of the check valve with the first and second flaps attached to the inlet and the third flap attached to the body, in accordance with one embodiment of the present invention.

In FIG. 12, as in one embodiment, shown are the first flap 60 and second flap 62 closed with slit 64 and the third flap 90 closed tightly to shut off any reverse fluid flow. The third substantially closed position 108 to a third closed position 106 is shown, this slow movement substantially lowers shut off noise. In FIG. 13, as in one embodiment, shown are first flap 60 and second flap 62 located below or downstream from third flap 90 when the fluid is in the reverse flow. First flap 60 and second flap 62 are attached to the inlet 16. Third flap 90 is attached to the body 14. In this arrangement the first flap 60 and second flap 62 still close first when the fluid is in a reverse flow and slowly close the third flap 90 to a tight seal.

While the present invention has been related in terms of the foregoing embodiments, those skilled in the art will recognize that the invention is not limited to the embodiments depicted. The present invention can be practiced with modification and alteration within the spirit and scope of the appended claims. Thus, the description is to be regarded as illustrative instead of restrictive on the present invention.

What is claimed is:
1. A check valve comprising:
a body, an outlet that connects to the body at a first seam between the body and the outlet, anin let that connects to the body at a second seam between the inlet and the body;
a first holder and a second holder on the outlet with a first alignment tab on the outlet;
a plurality of first flapper attachments on a first flapper mount shelf on the outlet;
a first ridge that surrounds the first flapper mount shelf on the outlet provides for a seal between the body and the outlet;
a first alignment notch that is disposed about the first ridge and formed into the first ridge, the first alignment tab, fits into the first alignment notch to properly align outlet and the body during assembly, the first ridge seats into outlet;
a first flap and a second flap, the first flap and the second flap have a plurality of holes, the first flap and the second flap are placed on the plurality of first flapper attachments at the plurality of holes leaving a gap between the first flap and second flap;
a second flapper seat, a second seat groove and a second flapper mount shelf, the second seat groove surrounds the second flapper seat all on the outlet;

a third holder that is a molded part of the body, a second alignment tab disposed about a body entrance end on the body;

a second flapper mount shelf surrounds the second seat groove and has a second plurality of flapper attachments, the second plurality of flapper attachments are in the shape of pins, a second ridge surrounds the second flapper mount shelf and provides for the seal between the body and the inlet, a second alignment notch is disposed about the second ridge and is formed into the second ridge, the second alignment tab fits into the second alignment notch to properly align the body and inlet during assembly, the second ridge seats into body and glue is applied to form a permanent connection between inlet and body; and a third flap having a third plurality of holes, the third flap is placed on the second plurality of flapper attachments at the third plurality of holes and the third flap seals an inlet inside diameter.

2. The check valve of claim 1, wherein the plurality of flapper attachments are in two separate opposing groups.

3. The check valve of claim 1, wherein glue is applied to form a permanent connection between outlet and body.

4. The check valve of claim 1, wherein the gap allows a reduced speed reverse fluid flow of the fluid and slowly closes the third flap to reduce shut off noise.

5. The check valve of claim 1, wherein the gap has a width that is in a range of 21 to 250 thousands of an inch.

6. The check valve of claim 1, wherein the gap allows a fluid to pass through at a reduced speed, the reduced speed fluid will close the third flap tightly.

7. The check valve of claim 1, wherein the body has a flow direction indicator.

8. A low sound stop valve comprising:

a second stage opened by a forward flow of a fluid, the second stage closing tightly when the forward flow of the fluid ceases and the fluid is in a reverse flow, the second stage blocks the reverse flow of the fluid past the second stage; the second stage having a third flap having a third plurality of holes, the third flap is placed on the second plurality of flapper attachments at the third plurality of holes and the third flap seals an inlet inside diameter; and a first stage disposed about the second stage, the first stage opening by the forward flow of the fluid and closing before the second stage, when the fluid is in the reverse flow leaving a gap, the gap causes a slow reverse flow of the fluid through the first stage which causes the second stage to slowly close and form a tight seal, the first stage having a plurality of first flapper attachments on a first flapper mount shelf on the outlet, a first ridge that surrounds the first flapper mount shelf on the outlet provides for a seal between the body and the outlet; a first alignment notch that is disposed about the first ridge and formed into the first ridge, the first alignment tab, fits into the first alignment notch to properly align outlet and body during assembly, the first ridge seats into outlet, a first flap and a second flap, the first flap and second flap have a plurality of holes, the first flap and second flap are placed on the plurality of first flapper attachments at the plurality of holes leaving the gap between the first flap and second flap, a second flapper seat, a second seat groove and second flapper mount shelf, the second seat groove surrounds the second flapper seat all on the outlet.

* * * * *